(12) United States Patent
Yamamoto et al.

(10) Patent No.: US 10,632,892 B2
(45) Date of Patent: Apr. 28, 2020

(54) MAGNETIC MARKER, MAGNETIC MARKER RETAINING METHOD, WORK APPARATUS FOR MAGNETIC MARKERS, AND MAGNETIC MARKER INSTALLATION METHOD

(71) Applicant: AICHI STEEL CORPORATION, Tokai-shi, Aichi (JP)

(72) Inventors: Michiharu Yamamoto, Tokai (JP); Tomohiko Nagao, Tokai (JP); Hitoshi Aoyama, Tokai (JP)

(73) Assignee: AICHI STEEL CORPORATION, Tokai-shi (JP)

( * ) Notice: Subject to any disclaimer, the term of this patent is extended or adjusted under 35 U.S.C. 154(b) by 0 days.

(21) Appl. No.: 16/077,012

(22) PCT Filed: Feb. 8, 2017

(86) PCT No.: PCT/JP2017/004527
§ 371 (c)(1),
(2) Date: Aug. 9, 2018

(87) PCT Pub. No.: WO2017/138554
PCT Pub. Date: Aug. 17, 2017

(65) Prior Publication Data
US 2019/0031076 A1    Jan. 31, 2019

(30) Foreign Application Priority Data

Feb. 10, 2016 (JP) .................................. 2016-023635

(51) Int. Cl.
*E01F 9/00* (2016.01)
*B60P 3/00* (2006.01)
(Continued)

(52) U.S. Cl.
CPC ................ *B60P 3/00* (2013.01); *E01C 23/18* (2013.01); *E01F 9/30* (2016.02); *E01F 9/512* (2016.02); *G05D 1/021* (2013.01)

(58) Field of Classification Search
CPC ... B60P 3/00; G05D 1/02; G05D 1/021; E01F 9/00; E01F 9/506; E01F 9/512; E01F 9/576
(Continued)

(56) References Cited

U.S. PATENT DOCUMENTS 3,668,624 A    6/1972  Spaulding
4,089,730 A *  5/1978  Mahn ...................... B65C 1/025
                                                                156/541
(Continued)

FOREIGN PATENT DOCUMENTS

CN    1164264 A    11/1997
JP    9-269621     10/1997
(Continued)

OTHER PUBLICATIONS

Office Action dated Dec. 16, 2019, issued in corresponding Chinese Patent Application No. 2017800105216, 5 pages (with English translation).

*Primary Examiner* — Raymond W Addie
(74) *Attorney, Agent, or Firm* — Xsensus LLP

(57) ABSTRACT

A magnetic marker retaining method that includes placing a plurality of sheet-shaped magnetic markers on a surface of a band-shaped carrier sheet, the plurality of sheet-shaped magnetic markers being so as to be spaced in a longitudinal direction of the band-shaped carrier sheet; and retaining the plurality of sheet-shaped magnetic markers in a state of a roll body with the band-shaped carrier sheet rolled up in a roll shape, the band-shaped carrier sheet being rolled up such that each surface of the plurality of sheet-shaped magnetic markers directly contacts the other side of the surface of the
(Continued)

band-shaped carrier sheet, on which the plurality of sheet-shaped magnetic markers are placed, and the plurality of sheet-shaped magnetic markers being to be laid on a road.

5 Claims, 11 Drawing Sheets

(51) Int. Cl.
*E01F 9/30* (2016.01)
*E01C 23/18* (2006.01)
*E01F 9/512* (2016.01)
*G05D 1/02* (2020.01)

(58) Field of Classification Search
USPC .......................................... 404/12–16, 75, 94
See application file for complete search history.

(56) References Cited

U.S. PATENT DOCUMENTS

| | | | |
|---|---|---|---|
| 4,792,259 A | | 12/1988 | Eigenmann |
| 5,853,846 A | * | 12/1998 | Clark ..................... B32B 5/16 428/131 |
| 6,378,772 B1 | | 4/2002 | Yonemura |
| 6,468,678 B1 | | 10/2002 | Dahlin et al. |
| 7,026,812 B2 | | 4/2006 | Honkura et al. |
| 8,350,565 B2 | | 1/2013 | Honkura et al. |
| 8,610,427 B2 | | 12/2013 | Honkura et al. |
| 9,664,768 B2 | | 5/2017 | Furuichi et al. |
| 2003/0123930 A1 | * | 7/2003 | Jacobs ..................... E01F 9/512 404/12 |
| 2008/0189038 A1 | | 8/2008 | Hole |

FOREIGN PATENT DOCUMENTS

| | | |
|---|---|---|
| JP | 11-272327 | 10/1999 |
| JP | 2000-45236 A | 2/2000 |
| JP | 2000-276691 A | 10/2000 |
| JP | 2005-202478 A | 7/2005 |
| JP | 2008-47148 A | 2/2008 |
| JP | 4655247 | 1/2011 |
| JP | 2012-154786 A | 8/2012 |
| JP | 2013-242299 A | 12/2013 |
| WO | 2005/019851 A1 | 3/2005 |
| WO | 2009/078296 A1 | 6/2009 |
| WO | 2009/119081 A1 | 10/2009 |
| WO | 2011/155527 A1 | 12/2011 |

* cited by examiner

[FIG. 1]
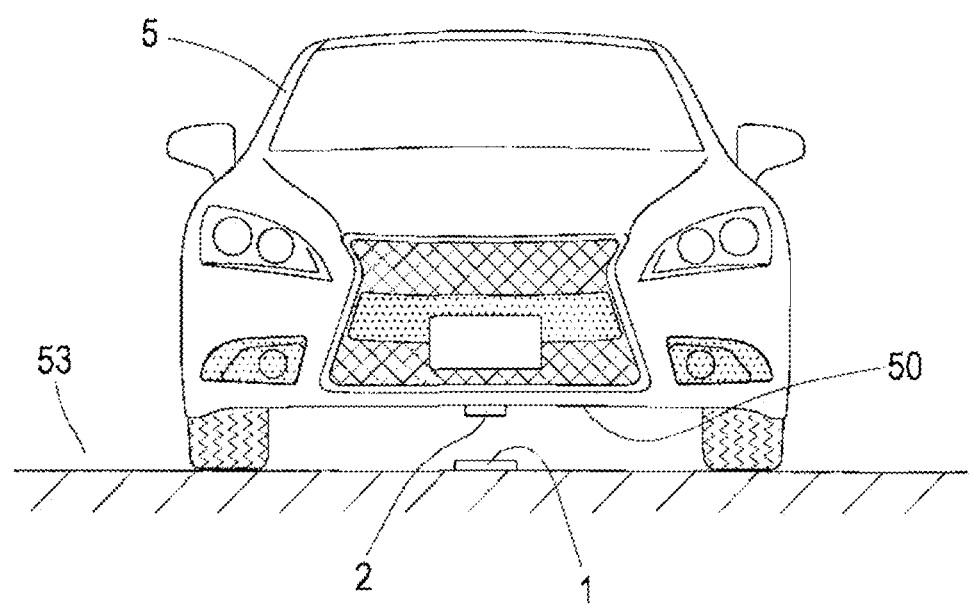

[FIG.2]
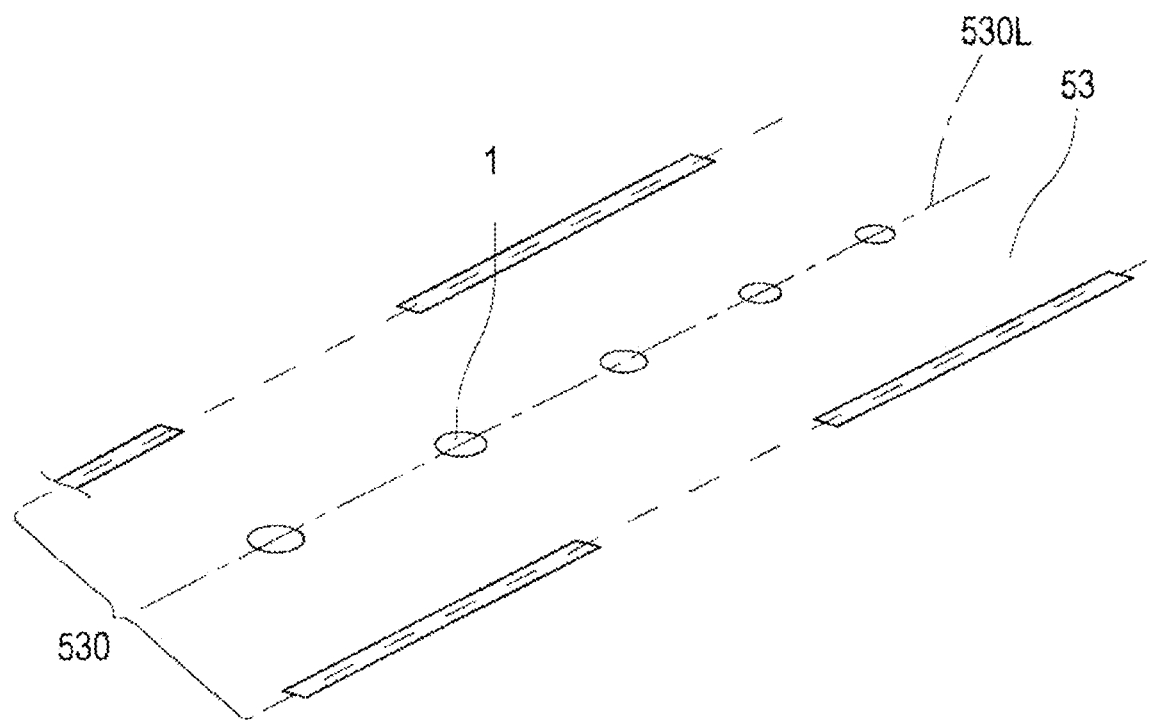

[FIG.3]
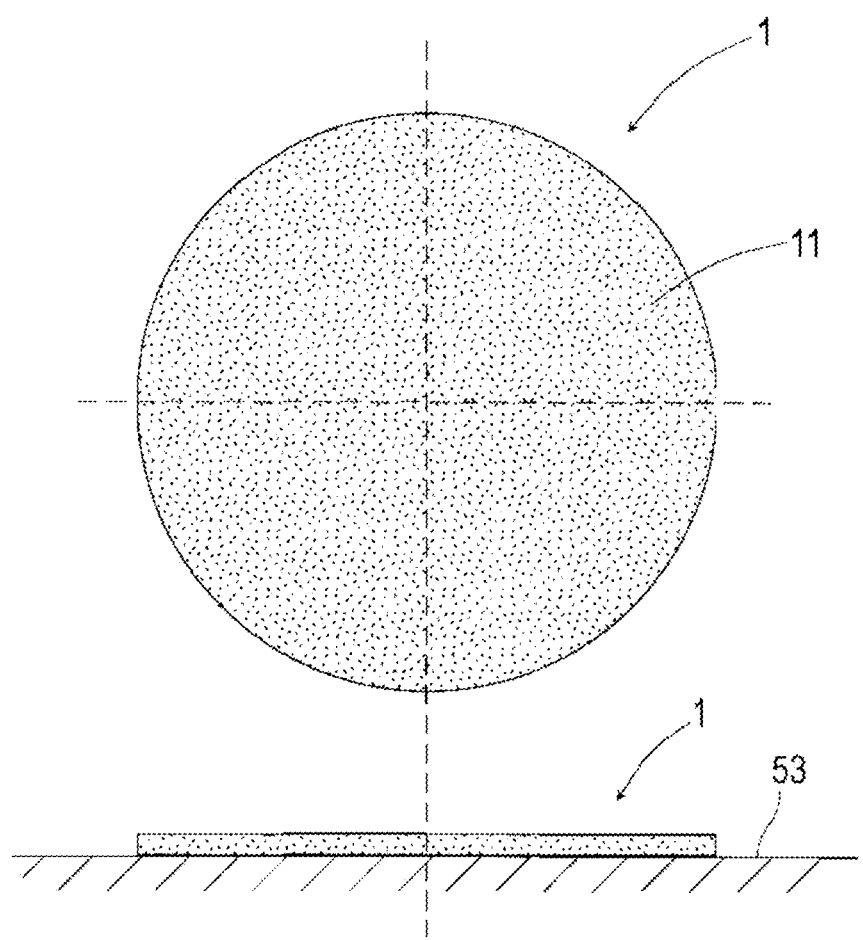

[FIG.4]
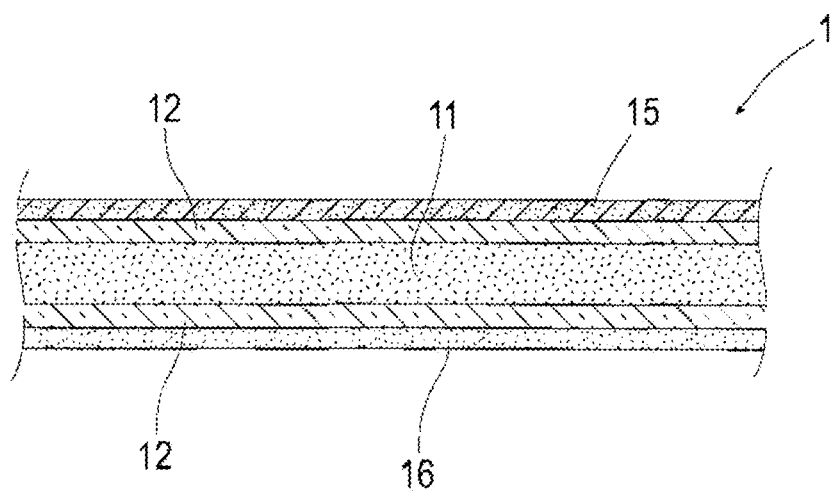

[FIG. 5]
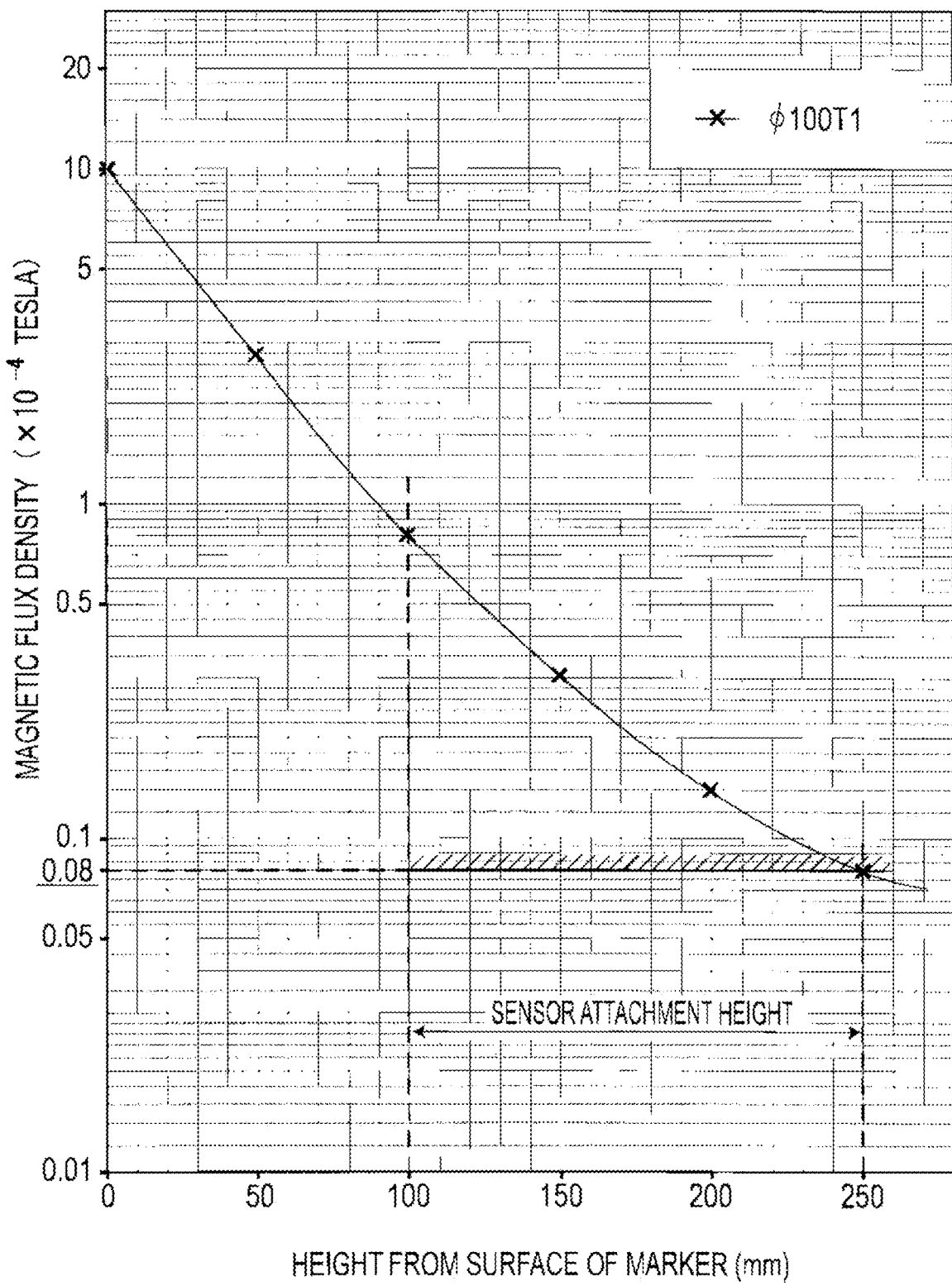

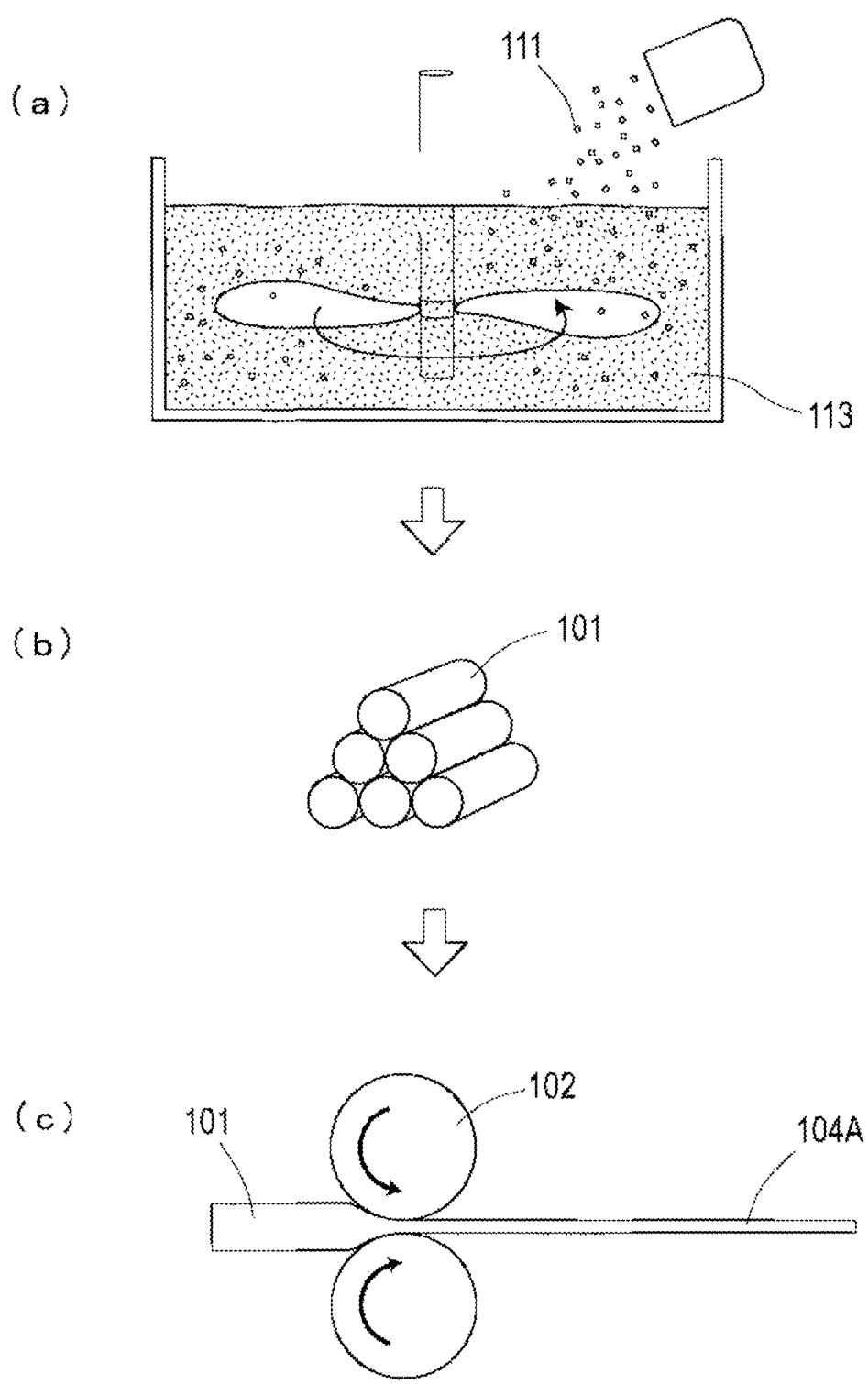

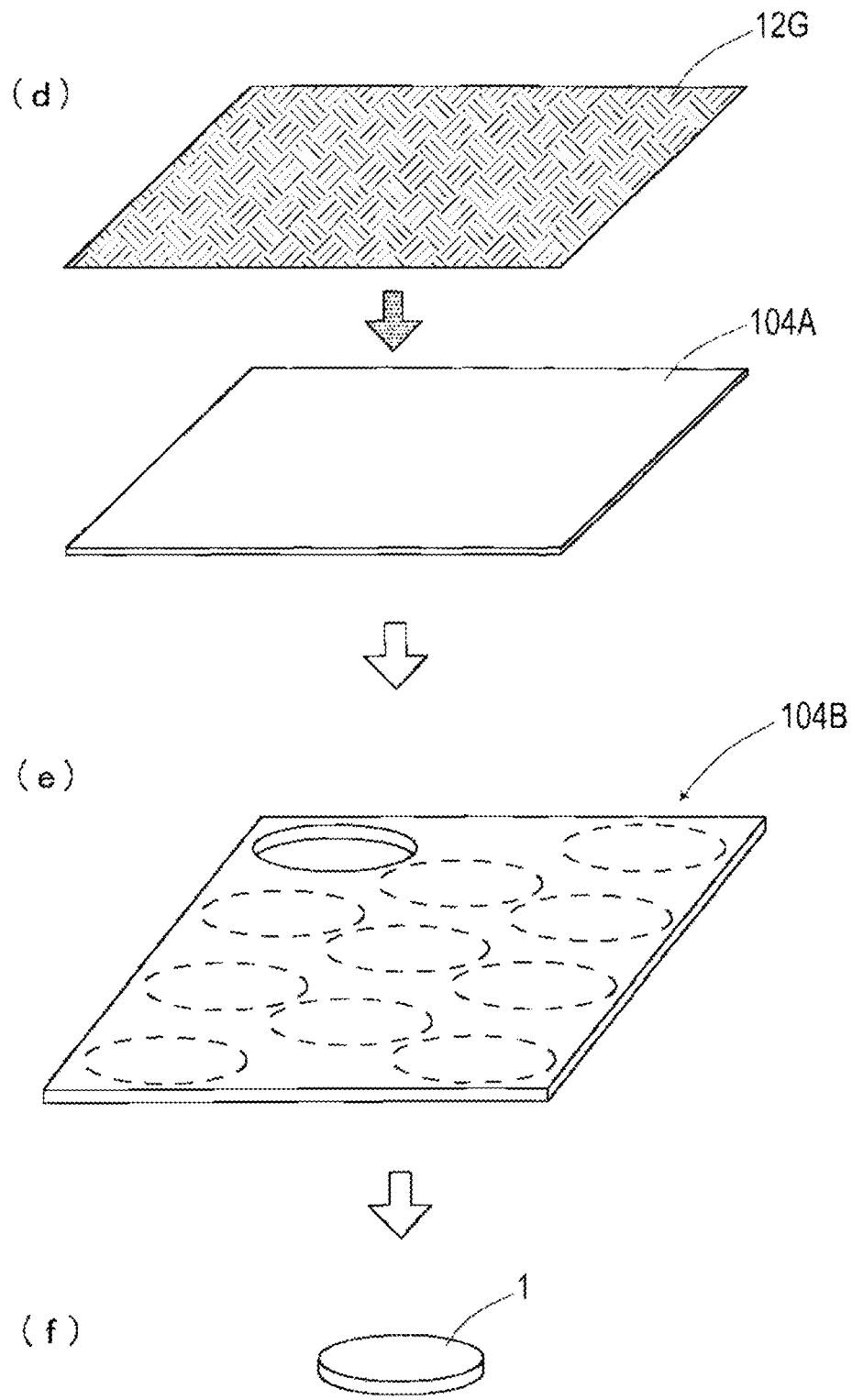
[FIG. 7]

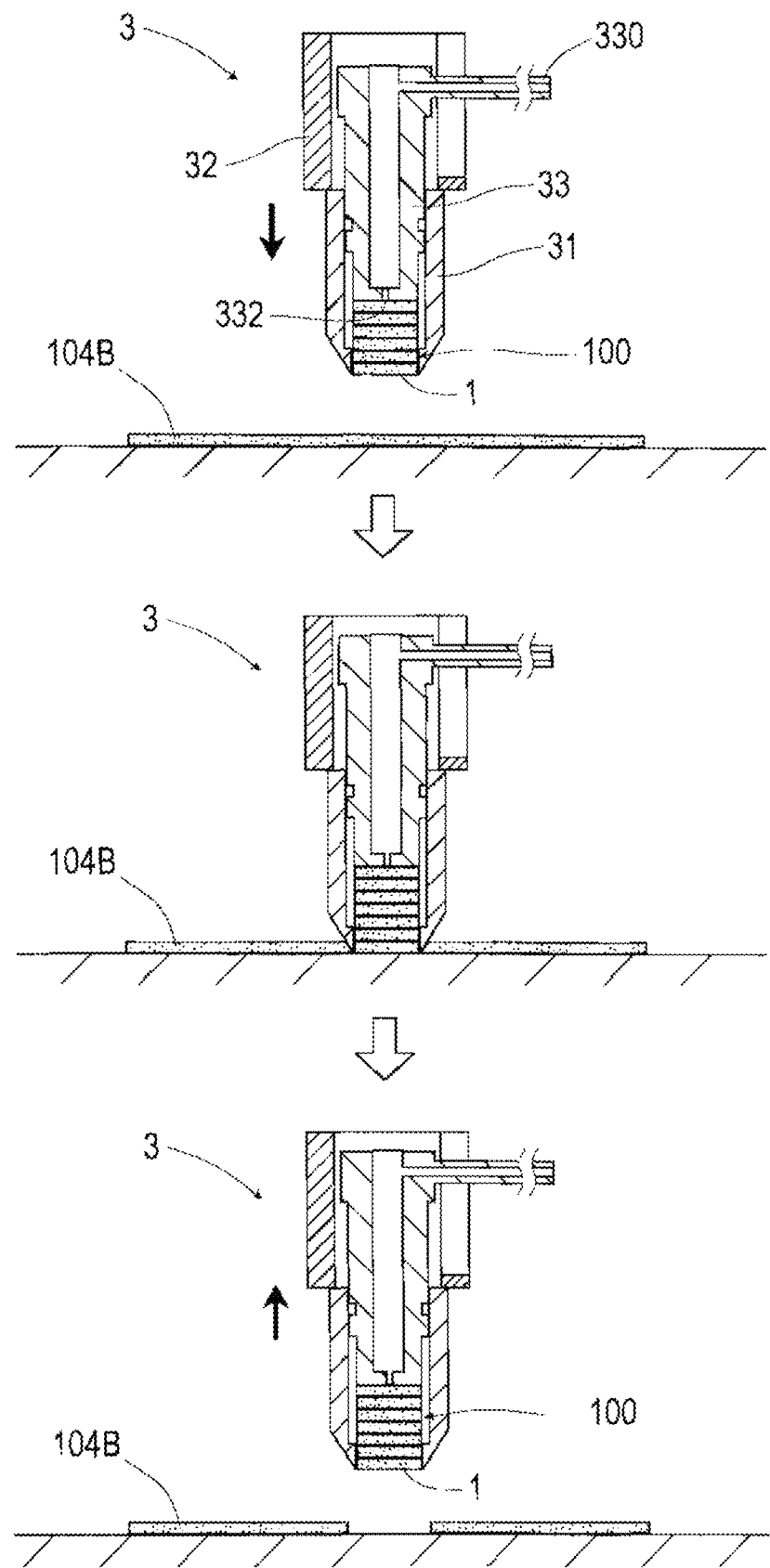
[FIG. 8]

[FIG. 9]
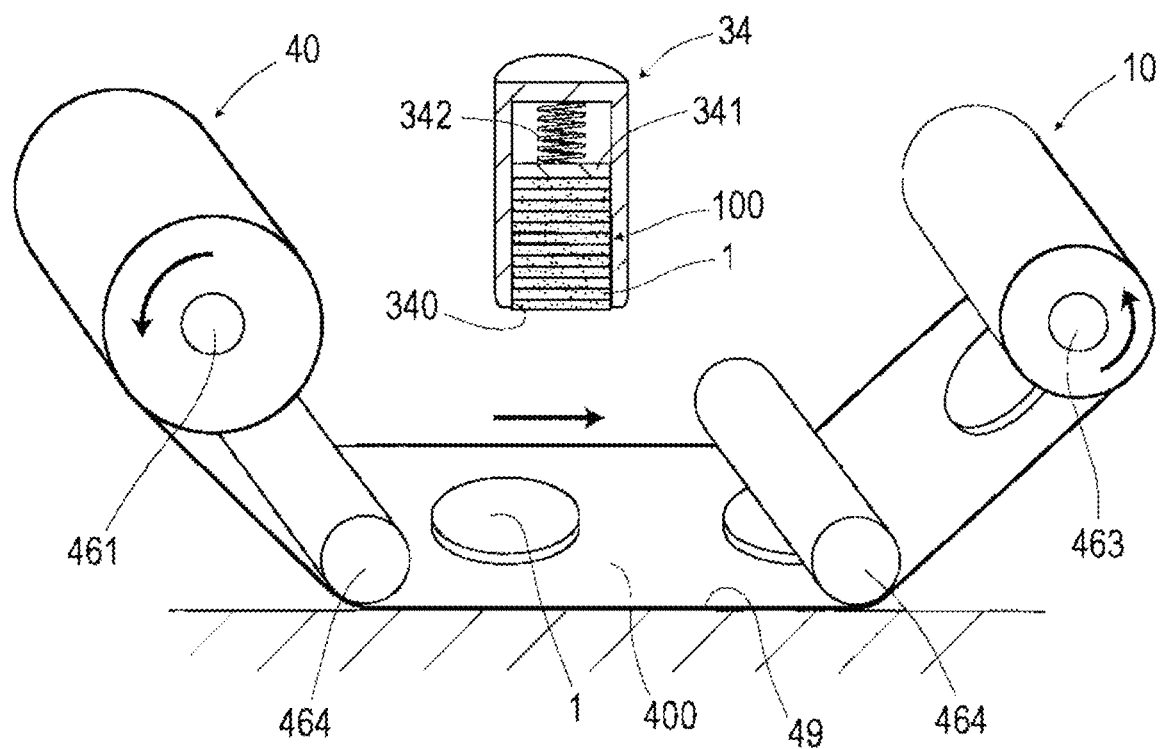

[FIG. 10]
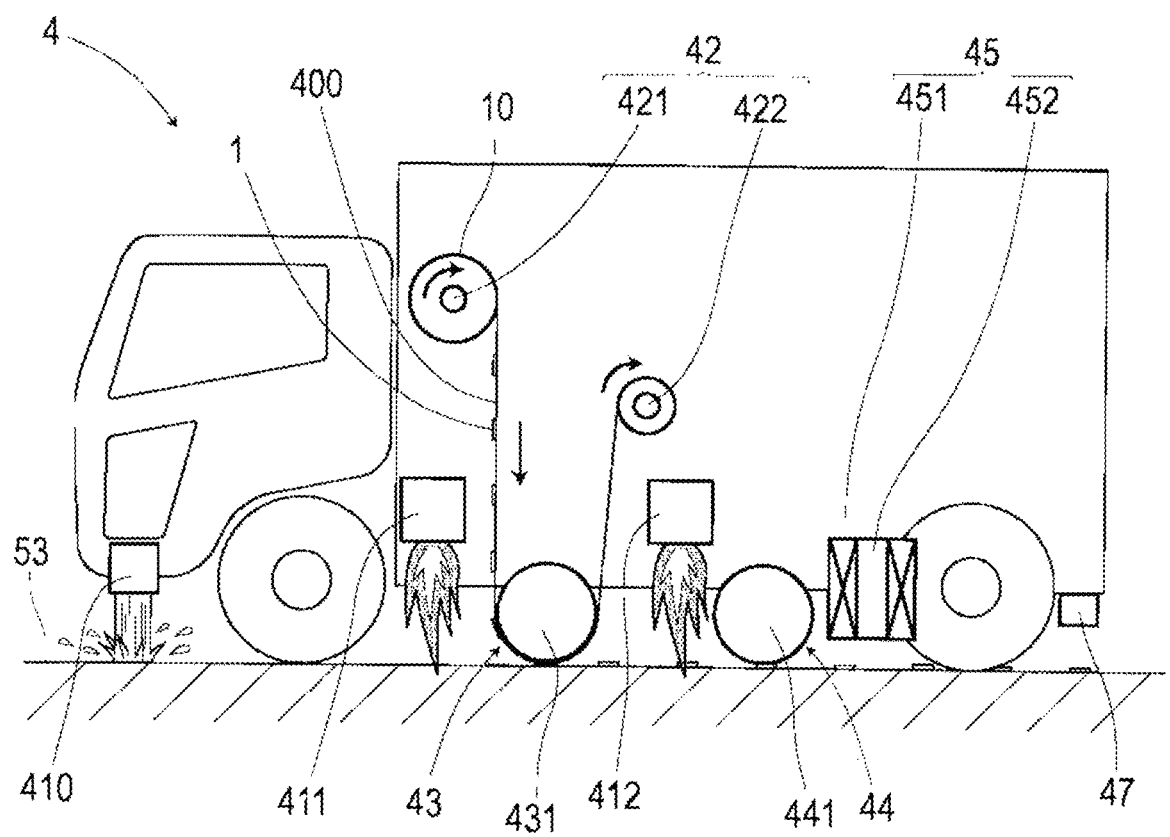

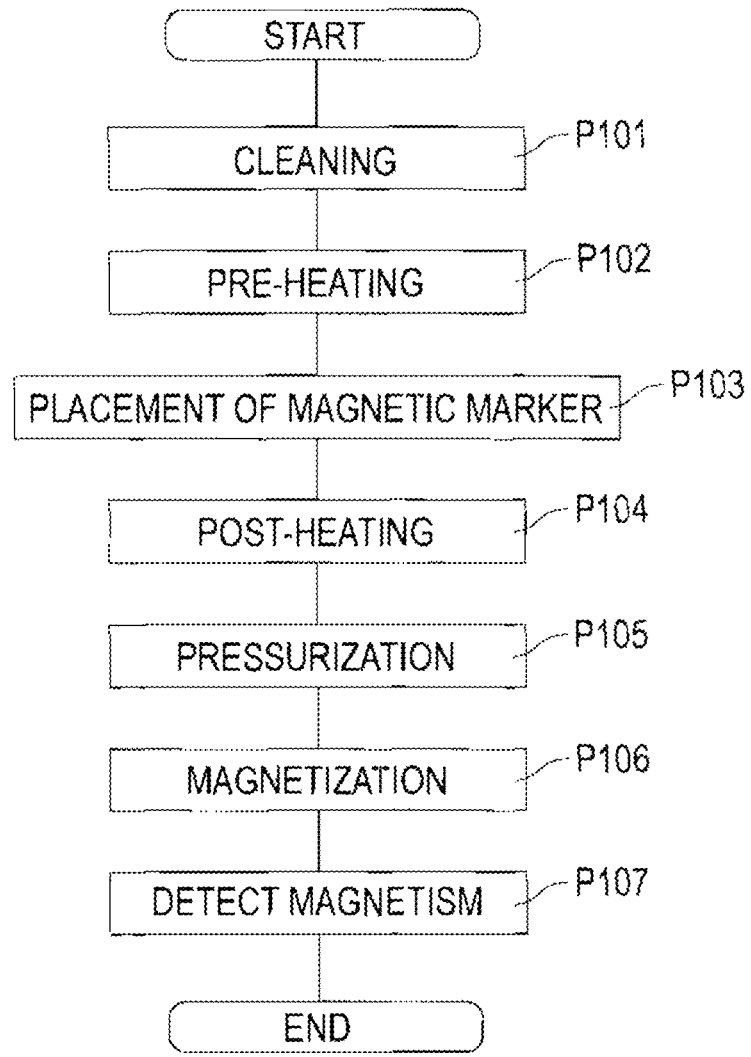

MAGNETIC MARKER, MAGNETIC MARKER RETAINING METHOD, WORK APPARATUS FOR MAGNETIC MARKERS, AND MAGNETIC MARKER INSTALLATION METHOD

TECHNICAL FIELD

The present invention relates to magnetic markers to be laid on a road.

BACKGROUND ART

Conventionally, a magnetic marker detection system for vehicles which detects a magnetic marker laid on a road by a magnetic sensor attached to a vehicle has been known (for example, refer to Patent Literature 1). According to this magnetic marker detection system, for example, there is a possibility that various driving assists using magnetic markers laid along a lane, such as automatic steering control and lane departure warning as well as automatic driving can be achieved.

CITATION LIST

Patent Literature

Patent Literature 1: Japanese Unexamined Patent Application Publication No. 2005-202478

SUMMARY OF INVENTION

Technical Problem

However, the above conventional magnetic marker has a problem as follows. For example, to achieve driving assist of lane departure warning, magnetic markers are required to be laid at relatively short spacing, and an increase in installation cost may not be avoidable unless favorable work efficiency for each magnetic marker is ensured.

The present invention was made in view of the above-described conventional problem to provide an installation method and work vehicle system for efficiently installing a magnetic marker.

Solution to Problem

One aspect of the present invention is directed to a magnetic marker installing method for installing a magnetic marker to be laid on a road so as to be detectable by a magnetic sensor attached to a vehicle in order to achieve vehicle-side control to achieve assist in driving operation of the vehicle by a driver or automatic driving not relying on operation of the driver, the method comprising:

a magnetizing process of magnetizing the magnetic marker placed on the road by acting on the magnetic marker with a magnetic field.

One aspect of the present invention is directed to a work vehicle system for laying the magnetic marker, including:

a magnetizing apparatus which acts with a magnetic field toward a road surface; and a detecting apparatus which detects magnetism generated by the magnetic marker.

Advantageous Effects of Invention

In the installing method according to the present invention, the magnetic marker placed on the road is magnetized. When this installing method is adopted, in placing the magnetic marker, it does not take time and effort, such as checking magnetic polarity in advance. Also, a work of taking out and re-placing the magnetic marker placed with erroneous magnetic polarity does not occur.

Also in this installing method, when the magnetic marker after laid is demagnetized or the like due to some circumstances, re-magnetization is performed, thereby allowing initial performance to be recovered. For example, a work of digging the magnetic marker buried or the like and replacing it with a new product and so forth are not required, and thus installation cost of the magnetic marker including maintenance can be reduced.

The work vehicle system according to the present invention includes the magnetizing apparatus which acts with a magnetic field toward a road surface, and is a system for installation capable of performing the above-described installing method. According to this work vehicle system, magnetization of the magnetic marker placed on the road can be efficiently performed. Furthermore, this work vehicle system includes the detecting apparatus which detects magnetism generated by the magnetic marker. If this work vehicle system is used, a series of works from magnetization of the magnetic marker to a check of magnetic characteristics after magnetization can be completely performed.

As described above, in the installing method according to the present invention, magnetic markers can be efficiently installed. If the work vehicle system according to the present invention is used, this installing method can be implemented with high work efficiency.

BRIEF DESCRIPTION OF DRAWINGS

FIG. 1 is a descriptive diagram exemplarily depicting a state of detecting a magnetic marker by a magnetic sensor of a vehicle.

FIG. 2 is a descriptive diagram exemplarily depicting a lane where magnetic markers are laid.

FIG. 3 depicts an upper view and a side view of the magnetic marker.

FIG. 4 is a sectional view depicting a sectional structure of the magnetic marker.

FIG. 5 is a graph depicting a magnetic field distribution of the magnetic marker in a vertical direction.

FIG. 6 is a descriptive diagram depicting the first half of processes of fabricating magnetic markers.

FIG. 7 is a descriptive diagram depicting the latter half of the processes of fabricating magnetic markers.

FIG. 8 is a descriptive diagram depicting a state of generating a roll body.

FIG. 9 is a descriptive diagram depicting a state of winding a carrier sheet which retains magnetic markers.

FIG. 10 is a descriptive diagram depicting a work vehicle.

FIG. 11 is a flowchart diagram depicting a procedure of installing the magnetic marker.

DESCRIPTION OF EMBODIMENT

A suitable aspect of the present invention is described.

A magnetization process included in the installing method according to the present invention may be a process of re-magnetizing the magnetized magnetic marker.

In this case, it is possible to perform magnetization for changing magnetic polarity of the magnetic marker and magnetization of the magnetic marker demagnetized due to a lapse of time after laying, the action of an external magnetic field, or the like. In this manner, if the magnetized magnetic marker can be re-magnetized in a laid state, installation cost including maintenance after laying can be reduced.

The work vehicle system according to the present invention may be a system configured of one work vehicle or may be a system configured of a plurality of, two or more, work vehicles. For example, when the work vehicle system is configured of two work vehicles, the magnetizing apparatus is provided to one work vehicle, and the detecting apparatus is provided to the other one work vehicle. In a magnetization work, the work vehicle provided with the magnetizing apparatus precedes.

EMBODIMENTS

First Embodiment

The present example is an example regarding a magnetic marker 1 to be laid on a road for the purpose of assist in vehicle's driving operation, automatic driving, information provision, and so forth. Details of this are described with reference to FIG. 1 to FIG. 11.

The magnetic markers 1 of FIG. 1 and FIG. 2 are laid, for example, in a line along a laying line 530L, which is a virtual line along the center of a lane 530 where a vehicle 5 runs. The magnetic markers 1 laid on a road surface 53 in this manner can be detected by, for example, a magnetic sensor 2 or the like attached to a bottom surface 50 of the vehicle 5. A detection signal of the magnetic marker 1 by the magnetic sensor 2 is inputted to, for example, an ECU not depicted or the like on a vehicle 5 side, and can be used in various types of control on the vehicle side, such as automatic steering control to keep the lane, driving support control such as lane departure warning, and automatic travelling control.

The magnetic marker 1 is, as depicted in FIG. 3 and FIG. 4, a marker in a flat circular sheet shape having a diameter of 100 mm and a thickness of 2.5 mm. In this magnetic marker 1, a protective layer 12 including a glass cloth 12G (FIG. 7), which is a fiber sheet of glass fiber, is laminated on both front and back surfaces of a magnetic layer 11 which generates magnetism. Furthermore, outside each protective layer 12, a layer mainly made of asphalt, which is a material for pavement, is laminated, and the magnetic marker 1 thus has a five-layer structure.

The magnetic layer 11 is a layer made of an isotropic magnet having a maximum energy product (BHmax)=6.4 kJ/m$^3$. This magnetic layer 11 is formed by dispersing magnetic powder 111 (FIG. 6), which is powder of iron oxide, in asphalt as a base material.

The protective layer 12 is a layer of a composite material (fiber-reinforced composite material) acquired by impregnating the glass cloth 12G with asphalt as a parent material (matrix).

Of layers outside the protective layers 12, a layer which faces the road surface 53 at the time of installation is a joint layer 16 made of asphalt. Asphalt forming this joint layer 16 functions as a bonding material when jointed to the road surface 53.

Of the layers outside the protective layers 12, a layer opposite to the joint layer 16 is a nonskid layer 15 with an aggregate such as sand mixed into asphalt.

The magnetic marker 1 is bonded to the road surface 53 with asphalt forming the joint layer 16 as a bonding material (FIG. 4). The thickness of the magnetic marker 1, that is, 2.5 mm, is as much as the thickness of a road surface marking such as a white line, speed limit display, and so forth printed on the road surface 53. Also, the nonskid layer 15 on the surface side is formed of asphalt, as with the surrounding road surface 53, and also includes the aggregate for a nonskid purpose. For this reason, the possibility that the driver feels uncomfortable when the vehicle's tires step on the magnetic marker 1 is low, and the possibility of occurrence of slipping and so forth is low.

Here, specifications of the magnetic marker 1 to be fabricated are partially depicted in Table 1.

TABLE 1

| Magnet type | Ferrite magnet |
| --- | --- |
| Outer diameter | φ 100 mm |
| Thickness | 1.0 mm (thickness of only the magnetic layer) |
| Magnetic flux density Gs of the surface | 1 mT |

According to a computer simulation performed by the axisymmetric three-dimensional magneto-static analysis using the finite-element method, a magnetic field distribution in a vertical direction of the magnetic marker 1 having a magnetic flux density Gs of the surface of 1 mT and a diameter of 100 mm is found as in FIG. 5. The drawing is a semilogarithmic graph in which a logarithmic scale of the magnetic flux density of magnetism acting in the vertical direction is set on the vertical axis and the height in the vertical direction with reference to the surface of the magnetic marker 1 (height from the surface of the marker) is set on the horizontal axis. According to the drawing, at a position of 250 mm corresponding to an upper limit of 100 mm to 250 mm, which is an assumed range of the attachment height of the magnetic sensor 2 on the vehicle 5 side, the magnetic flux density at which the magnetic marker 1 acts can be grasped as 8 micro tesla (0.08×10$^{-4}$ tesla). Note that the accuracy of the used computer simulation has been confirmed in advance by the inventors through a substantive experiment.

For example, if a highly-sensitive magneto-impedance (MI) sensor having a measurement range of the magnetic flux density of ±0.6 milli tesla and a magnetic flux resolution within the measurement range of 0.02 micro tesla is adopted, the magnetic field of 8 micro tesla at which the magnetic marker 1 acts can be detected with high reliability.

The magneto-impedance (MI) sensor is a magnetic sensor using a magneto-impedance element including a magneto-sensitive body with its impedance changing in accordance with an external magnetic field. The magneto-impedance element (MI element) is an element which detects magnetism by using the magneto-impedance effect (MI effect), in which the depth (thickness) of the skin layer is fluctuated by the external magnetic field due to the skin effect, in which the current density of the skin layer increases when a pulse current, high-frequency current, or the like flows through the magneto-sensitive body, causing the impedance of the magneto-sensitive body to change in a sensitive manner. According to the MI element using this MI effect, highly-sensitive magnetic measurements can be performed. The use of the MI element can achieve a low-cost, small-sized magnetic sensor capable of detecting feeble magnetism on the order of, for example, 0.5 μT to 10 μT. Note that as for the MI sensor using the MI element, many applications have been filed and detailed descriptions are in, for example, International Publication No. WO2005/19851, International Publication No. WO2009/119081, and Japanese Patent No. 4655247.

Next, respective items including (1) fabrication of magnetic markers, (2) formation of a roll body retaining the magnetic markers, and (3) installation of the magnetic markers are sequentially described.

(1) Fabrication of Magnetic Markers

In the present example, after a magnetic sheet 104A forming the magnetic layer 11 is formed, an intermediate sheet 104B for punching with a layer forming the protective layer 12 and so forth laminated on both front and back surfaces is acquired as an intermediate work. Then, by punching process targeted at this intermediate sheet 104B, the magnetic markers 1 before magnetization are fabricated.

To fabricate the magnetic sheet 104A, slurry 113 with the magnetic powder 111 (in the present example, powder of iron oxide) blended in asphalt in a molten state as a base material is generated (FIG. 6(*a*)). After pellets 101 (FIG. 6(*b*)) acquired by molding this slurry 113 in a predetermined shape are dried, they are thinly extended by a rolling roller 102 into a sheet shape, thereby fabricating the sheet-shaped magnetic sheet 104A (FIG. 6(*c*)). This magnetic sheet 104A is a sheet forming a first layer as the magnetic layer 11 of the magnetic marker 1.

Subsequently, by performing a process of laminating a second layer or the like as the protective layer 12 of the magnetic marker 1 on both front and back surfaces of this magnetic sheet 104A, the intermediate sheet 104B, which is an intermediate work for punching out the magnetic markers 1, is generated. In the present example, this process is performed in a state in which the magnetic sheet 104A is horizontally extended so that the work surface faces upward in the vertical direction, and the magnetic sheet 104A is turned inside out to perform a similar process on both front and back surfaces.

First, the glass cloth 12G, which is a woven fabric of glass fiber, is placed so as to cover the surface of the magnetic sheet 104A (FIG. 7(*d*)). Then, a molten material mainly made of asphalt is applied to the surface of the glass cloth 12G to impregnate the glass cloth 12G with asphalt. With this, a composite material with asphalt, which is a parent material (matrix), reinforced by the glass cloth 12G is formed. With this, the above-described second layer made of the composite material can be formed.

Thereafter, the above-described molten material exceeding an amount which allows the glass cloth 12G to be impregnated with asphalt is further supplied. Then, a layer mainly made of asphalt can be formed outside the above-described second layer made of the composite material. Note that different components of the molten material are applied on both surfaces of the magnetic sheet 104A. While the components of the molten material applied to one surface are asphalt almost entirely, the molten material applied to the other surface is a material with an aggregate such as sand mixed into asphalt. The layer formed of asphalt with the aggregate mixed thereinto serves as the above-described nonskid layer 15 of the magnetic marker 1, and the layer formed of asphalt almost only serves as the above-described joint layer 16 of the magnetic marker 1.

The intermediate sheet 104B of FIG. 7(*e*) fabricated in this manner is a sheet with a layer serving as the protective layer 12 and a layer serving as the joint layer 16 laminated on one surface side of the magnetic sheet 104A and with a layer serving as the protective layer 12 and a layer serving as the nonskid layer 15 laminated on the other surface side. The sectional structure of this intermediate sheet 104B is a five-layer structure (omitted in the drawing) with a second layer forming the protective layer 12 laminated on both of front and back surfaces of a first layer forming the magnetic layer 11 and, furthermore, with a layer serving as the joint layer 16 or the nonskid layer 15 laminated outside this second layer.

The intermediate sheet 104B is a large-format sheet where the plurality of magnetic markers 1 can be punched out. For example, in FIG. 7(*e*), a solid-line circle indicates a punched position, and broken-line circles indicate positions planned to be punched out. For punching out the magnetic markers 1, for example, as depicted in FIG. 8, a cylindrical punching die 3 that can accommodate the punched magnetic markers 1 can be used. The punching die 3 is configured of a Thomson holder 32 which follows an oil-hydraulic cylinder not depicted to vertically give a stroke, a substantially cylindrical Thomson die 31 having a circular blade at its tip, and a suction unit 33 that can slidably move in a cylinder direction in a state of being inserted and placed in the Thomson die 31.

The suction unit 33 of FIG. 8 includes a suction port 330 which connects a tube provided to extend from an air pump not depicted, and this suction port 330 communicates an inlet 332 at a tip surface via a pneumatic circuit. This suction unit 33, as in the drawing, suctions the magnetic markers 1 punched out from the intermediate sheet 104B, and also recedes by that thickness every time the magnetic marker 1 is newly punched out. This makes the punched magnetic markers 1 sequentially stacked inside the Thomson die 31.

If the punching process is continuously performed by using the punching die 3 of FIG. 8 as the position of the intermediate sheet 104B is sequentially shifted, a stack 100 with the plurality of punched magnetic markers 1 (FIG. 7(*f*)) stacked can be formed. In the course of continuously performing the punching process, the intermediate sheet 104B may be replaced. If the intermediate sheet 104B is replaced in midstream, the stack 100 with a larger number of magnetic markers 1 stacked can be acquired.

(2) Formation of a Roll Body Retaining the Magnetic Markers

In consideration of convenience in storage, transportation to an installation site, and so forth, a roll body 10 to retain the magnetic markers 1 is used. In the present example, this roll body 10 is fabricated based on a sheet roll 40 acquired by winding a polyethylene-made carrier sheet 400 in a long band shape in a roll shape (refer to FIG. 9). Note in the present example that the width of the carrier sheet 400 is set at 150 mm so as to correspond to the diameter of the magnetic marker 1 of 100 mm.

To transfer the magnetic marker 1, it is preferable that the carrier sheet 400 is rolled out from the sheet roll 40 set to a roll-out shaft 461 and its tip is hooked to a roll-up shaft 463 via an upper surface of a work surface 49 by using guide rollers 464 or the like. To transfer the magnetic marker 1 to the carrier sheet 400 on the work surface 49, for example, a holder 34 can be used, which accommodates the stack 100 and supplies the magnetic markers 1 one by one to an outlet 340. The holder 34 can transfer the magnetic markers 1 one by one as stamping in a state in which the outlet 340 faces the carrier sheet 400.

The holder 34 has a support plate 341 biased by a biasing member 342 in a push-out direction. The stack 100 biased by this support plate 341 in the push-out direction is positioned so that an end face is flush with the outlet 340 with its inner diameter slightly narrowed down. After one magnetic marker 1 is transferred as being stamped to the carrier sheet 400, when the holder 34 is caused to recede, the stack 100 biased by the support plate 341 is pushed out so as to be flush with the outlet 340 to advance by the thickness of the magnetic marker 1, and becomes in a state of being capable of transferring the next magnetic marker 1 to the carrier sheet 400.

Note that in the holder 34, the stack 100 is accommodated so that the nonskid layer 15 faces the opening side of the outlet 340. Therefore, if the magnetic markers 1 are transferred to the carrier sheet 400 by using this holder 34, the state becomes such that the nonskid layer 15 of the magnetic marker 1 is positioned on a carrier sheet 400 side and the joint layer 16 is positioned on an opposite side.

To fabricate the roll body 10, the rotation speed of the roll-out shaft 461 and the roll-up shaft 463 is controlled so that a roll-out portion of the carrier sheet 400 passes along the work surface 49 at a constant speed. If the above-described holder 34 is caused to ascend and descend as stamping at constant time intervals while the carrier sheet 400 is passing, the magnetic markers 1 can be transferred to the carrier sheet 400 at constant spacings. On the roll-up shaft 463 side, the carrier sheet 400 retaining the magnetic markers 1 at constant spacings is rolled up, and the roll body 10 which retains the magnetic markers 1 can be fabricated.

(3) Installation of the Magnetic Markers

Described first is the structure of the work vehicle 4, which is one example of a working apparatus or work vehicle system to be applied to installation of the magnetic markers 1 retained on the roll body 10, and then the procedure of installation by this work vehicle 4 is described.

The work vehicle 4 depicted in FIG. 10 is a special vehicle equipped with a cleaning apparatus 410 which cleans the road surface 53 where the magnetic markers 1 are installed, two heating apparatuses 411 and 412 which heat the road surface 53 and so forth, a supply apparatus 42 which supplies the magnetic markers 1, a placing apparatus 43 which places the magnetic markers 1 supplied from the supply apparatus 42 to the road surface 53, a pressurizing apparatus 44 which pressurizes the road surface 53, a magnetizing apparatus 45 which magnetizes the installed magnetic markers 1, and a detecting apparatus 47 which detects magnetism.

The cleaning apparatus 410 is an apparatus including an injection nozzle which injects a high-pressure water stream toward the road surface.

The heating apparatuses 411 and 412 are apparatuses each of which includes a burner which throws flames and is provided with a flame throw port so as to face the road surface 53. The two heating apparatuses 411 and 412 are provided at the front and back across the placing apparatus 43. The first heating apparatus 411 at the front side heats the road surface 53 before the magnetic marker 1 is placed, and the second heating apparatus 412 at the back side heats the road surface 53 after the magnetic marker 1 is placed.

The supply apparatus 42 is an apparatus which supplies the magnetic markers 1 retained on the carrier sheet 400 to the placing apparatus 43. The supply apparatus 42 handles the above-described roll body 10 and allows the carrier sheet 400 to be rolled out to take out the magnetic marker 1. The supply apparatus 42 includes a roll-out shaft 421 for setting the roll body 10 and a roll-up shaft 422 which rolls up the carrier sheet 400 rolled out from the roll body 10. The carrier sheet 400 rolled out from the roll body 10 and before being rolled up to the roll-up shaft 422 is wound around the outer periphery of a pressure roller 431 configuring the placing apparatus 43, in a state in which the retained magnetic markers 1 are on the outside. Here, the roll-out shaft 421 configures means for retaining the roll body 10 so that the carrier sheet 400 can be rolled out, and the roll-up shaft 422 configures means for rolling up the carrier sheet 400 rolled out from the roll body 10 and after the magnetic markers 1 are taken out.

The placing apparatus 43 is an apparatus which places the magnetic markers 1 onto the road surface 53. The placing apparatus 43 includes the pressure roller 431 which rolls, with the carrier sheet 400 wound therearound, while pressurizing the road surface 53. By pressing the carrier sheet 400 onto the road surface 53 while rolling over the road surface 53, the pressure roller 431 transfers the magnetic markers 1 retained on the carrier sheet 400 to the road surface 53.

The pressurizing apparatus 44 is an apparatus which includes a pressure roller 441 which pressurizes while rolling over the road surface 53 and levels off the road surface 53 by the weight of this pressure roller 441. The pressurizing apparatus 44 is placed on a rear side behind the second heating apparatus 412 so as to level off the road surface 53 after the magnetic marker 1 is heated.

The magnetizing apparatus 45 is an apparatus which magnetizes the magnetic marker 1 laid on the road surface 53 by acting on the magnetic marker 1 with a magnetic field so that the magnetic marker 1 has magnetic polarity. The magnetizing apparatus 45 includes a magnetic field generating unit including a combination of a cylindrical coil 451 acquired by winding an electric wire and an iron core 452 made of a ferromagnetic material inserted and placed inside the coil 451, a power supply unit (omitted in the drawing) which controls energization with respect to the coil 451, and so forth. This magnetizing apparatus 45 is placed on a further back side of the second heating apparatus 412 on the back side and the pressure roller 441, and performs magnetization with the heated and pressurized magnetic marker 1 as a target. Note that it is also effective to provide an air-blowing apparatus for cooling the magnetic marker 1 after pressurization and before magnetization. While efficient magnetization may not be made in a state in which the temperature of the magnetic marker 1 is high and near the Curie temperature, efficient magnetization can be made if the magnetic marker 1 is cooled in advance.

The method of installing the magnetic marker 1 using the above-structured work vehicle 4 (FIG. 11) is a method of performing the following processes, in the order of: a cleaning process P101 of cleaning the road surface 53 corresponding to a position where the magnetic marker 1 is to be laid, a first heating process P102 of heating the road surface 53 in advance, a placing process P103 of placing the magnetic marker 1 on the road surface 53, a second heating process P104 of heating the road surface 53 having the magnetic marker placed thereon, a pressurizing process P105 of pressurizing the road surface 53 having the magnetic marker 1 placed thereon, a magnetizing process P106 of magnetizing the magnetic marker 1 placed on the road by acting on the magnetic marker 1 with a magnetic field, and a detecting process P107 of detecting magnetism generated from the magnetic marker 1.

Note that in the work vehicle 4 of FIG. 10, each apparatus is placed so that, in accordance with an advance, a position to be cleaned by the cleaning apparatus 410, a position to be heated by the first heating apparatus 411 on the front side, a position where the magnetic marker 1 is to be placed by the placing apparatus 43, a position to be heated by the second heating apparatus 412 on the back side, a position to be pressured by the pressurizing apparatus 44, a position to be magnetized by the magnetizing apparatus 45, and a position to be detected by the detecting apparatus 47 pass, in this order, a position where the magnetic marker 1 is to be laid.

By advancing this work vehicle 4, it is possible to sequentially perform the respective processes such as the cleaning process P101, the first heating process P102, the placing process P103, the second heating process P104, the pressurizing process P105, the magnetizing process P106, and the detecting process P107. In the following, details of each process (FIG. 11) configuring the method of installing the magnetic marker 1 are described.

The above-described cleaning process P101 is a process of removing dirt and soil on the road surface 53 and cleaning the position where the magnetic marker 1 is to be laid by injecting a high-pressure water stream from the injection nozzle of the cleaning apparatus 410 attached so as to face the road surface 53.

The first heating process P102 is a pre-heating process of heating, in advance, the road surface 53 corresponding to the position where the magnetic marker 1 is to be laid by the burner of the heating apparatus 411. This process is performed when the position where the magnetic marker 1 is to be laid becomes included in a range to be heated by the first heating apparatus 411 on the front side of the work vehicle 4 moving along the lane. Note that the position where the magnetic marker 1 is to be laid may be a position marked in advance with a cross mark or the like, or may be a predetermined position measured by a DGPS (Differencial Global Positioning System). According to this first heating process P102, asphalt, which is a material for pavement to form the road surface 53, can be heated and softened by flames thrown by the burner.

The placing process P103 is a process of transferring and placing, on the road surface 53, the magnetic marker 1 retained on the carrier sheet 400 rolled out from the roll body 10. Rolling out of the carrier sheet 400 from the roll body 10 by the supply apparatus 42 is performed by following the rotation of driving wheels of the work vehicle 4 via a decelerating mechanism not depicted. The degree of deceleration by the decelerating mechanism is adjusted, for each arrival of the position where the magnetic marker 1 is to be laid, so that the magnetic marker 1 retained on the carrier sheet 400 is positioned in a gap between the pressure roller 431 and the road surface 53. The magnetic marker 1 positioned in the gap between the pressure roller 431 and the road surface 53 is pressed by the pressure roller 431 onto the road surface 53 for pressure-bonding.

As described above, on the carrier sheet 400, the magnetic markers 1 are retained with the nonskid layer 15 on the inside (on the sheet side) and the joint layer 16 on the outside. If the carrier sheet 400 is pressurized from the back side, the magnetic marker 1 can be placed in a state in which the joint layer 16 is pressed onto the road surface 53. When the magnetic marker 1 is placed, the road surface 53 is heated and in a high-temperature state. Thus, asphalt forming the joint layer 16 is warmed up to be softened, and becomes integrated with asphalt on the road surface 53 side. This makes asphalt function as a bonding material, allowing the magnetic marker 1 to be bonded.

In the second heating process P104, the process is a post-heating process of heating the magnetic marker 1 placed on the road surface 53 together with the surrounding road surface 53. According to this heating process P104, together with asphalt of the surrounding road surface 53, asphalt of the nonskid layer 15 forming the surface of the magnetic marker 1 can be heated to be softened.

The pressurizing process P105 is a process of pressurizing after heating the magnetic marker 1 and its surroundings. If this process analogous to a process of paving the road surface 53 of the road is performed, the road surface 53 having the magnetic marker 1 laid thereon can be leveled off with high uniformity. Also, asphalt of the nonskid layer 15 on the surface side of the magnetic marker 1 and the surrounding asphalt can be nearly integrated to eliminate their boundary.

The magnetizing process P106 is a process of magnetizing the laid magnetic marker 1 by acting on the magnetic marker with a magnetic field.

The detecting process P107 is a process of detecting magnetism generated from the magnetic marker 1 to perform an inspection as to whether a desired magnetic characteristic has been achieved by magnetization. If passing the inspection by this detecting process P107, laying of the magnetic marker 1 is completed.

Next, features and others of (1) magnetic marker itself, (2) magnetic marker fabricating method, (3) roll body, and (4) installation of the present example are described in generalities.

(1) Regarding the Magnetic Marker

The magnetic marker 1 of the present example is the magnetic marker 1 with the protective layer 12 including the glass cloth 12G laminated on both front and back surfaces of the magnetic layer 11 where the magnetic powder 111 is dispersed in asphalt as a base material. This protective layer 12 is formed of a composite material with the glass cloth 12G impregnated with asphalt. According to the protective layer 12 made of the composite material with characteristics such as material strength, wear resistance, and so forth of asphalt improved by glass fiber, the inner magnetic layer 11 can be protected, and durability of the magnetic marker 1 can be improved.

In the magnetic marker 1, the joint layer 16 made of asphalt is formed outside the protective layer 12 on the side facing the road surface 53 at the time of laying. Also, outside the protective layer 12 on the surface side of the magnetic marker 1 at the time of laying, the nonskid layer 15 with the aggregate mixed into asphalt is formed. Although will be described further below in detail, at the time of installation, the joint layer 16 is useful as a layer which functions as a bonding material. The nonskid layer 15 is useful as a layer integrated with the road surface 53 after laying to contribute to prevention of slipping of a vehicle tire.

As described above, by achieving high durability with a simple structure, the magnetic marker 1 is a product with excellent characteristics, achieving low cost and small size.

As a base material forming the magnetic layer 11 configuring the magnetic marker 1, asphalt, which is a high-polymer material, is exemplarily described in the present example. In place of this, a resin material such as rubber or plastic, which is a high-polymer material, may be adopted as a base material. If rubber is used as a base material, a rubber magnet is formed. If plastic is used as a base material, a plastic magnet is formed. A magnet with the magnetic powder 111 dispersed by taking a high-polymer material such as asphalt, rubber, or a resin material as a base material has flexibility, and has an advantage of less occurrence of a crack compared with, for example, a magnet such as a sintered magnet. With the magnetic marker 1 with high flexibility, it is possible to address asperities on the road surface 53 at the time of installation, and thus installation failures can be reduced. Also, it is possible to address also deformation and so forth of the road surface 53 during operation, and thus the occurrence of failures in a use period over a long period of time can be reduced. Furthermore, the magnetic sheet 104A with a high-polymer material such as asphalt as a base material can be molded at relatively low cost with high accuracy, and it is thus possible to provide the magnetic marker 1 with high quality while reducing production cost.

While the base material forming the magnetic layer 11 is a resin material, the parent material of the protective layer 12 may be a different material such as asphalt.

While the glass cloth 12G is exemplarily described as fiber forming the protective layer 12, a nonwoven fabric or single fiber may be used. Also, while the composite material acquired by impregnating with asphalt is exemplarily described as a material forming the protecting layer 12, a layer made of a carbon cloth or glass cloth only may be used. Covering the magnetic layer 11 with a glass cloth or the like is effective in enhancing durability.

The nonskid layer 15 may be, for example, a coated film layer with powder coating having a hard aggregate mixed in a polyamide resin material.

The magnetic material forming the magnetic powder 111 is not limited to an iron oxide of the present example, and any of various materials such as neodymium and samarium cobalt can be adopted. As for the material forming the base material and the magnetic material forming the magnetic powder 111, it is preferable that an appropriate magnetic material is selectively determined in accordance with magnetic specifications, environmental specification, and so forth required for the magnetic marker 1. Iron oxide in a state in which the metal has already been oxidized has advantages such that degradation in performance due to rust or the like is small and initial performance can be maintained over a long period of time. The magnetic marker 1 has a structure in which both surfaces of the magnetic layer 11 are covered with the protective layer 12 and so forth formed of asphalt having water vapor permeation to some extent, and hermeticity of the magnetic layer 11 cannot be said to be perfect. If magnetic powder of an iron oxide is adopted, the possibility of degradation in performance due to oxidation or the like is small even in an imperfect hermetic state, and thus the possibility of losing initial performance of the magnetic marker 1 is small.

Note that in the magnetic marker 1, while asphalt is adopted as a base material of the magnetic layer 11, the nonskid layer 15 and the joint layer 16 mainly made of asphalt are laminated outside. In this manner, if the base material of the magnetic layer 11 and the component materials of the joint layer 16 and the nonskid layer 15 are the same material, the magnetic powder 111 included in the magnetic layer 11 may flow out to the joint layer 16 and the nonskid layer 15. On the other hand, according to the glass cloth 12G configuring the protective layer 12, the outflow of the magnetic powder 111 can be prevented, and degradation in magnetic characteristics of the magnetic marker 1 can be prevented.

Note that in place of the method of fabricating magnetic markers by punching, magnetic markers can also be fabricated one by one. Also, the magnetic markers can be handled one by one, not being made as a stack or roll body. While the magnetic marker provided in advance with the joint layer and the protective layers is exemplarily described, a magnetic marker with a three-layer structure of a magnetic layer and protective layers on both surfaces or a magnetic marker with a two-layer structure of a magnetic layer and a protective layer may be used. In this case, at the time of installation, a bonding layer may be provided and bonded to the road surface, and a material for pavement or the like may be placed on the surface side.

The protective layer including fiber is not essential, and a magnetic marker with the outer periphery of the magnetic layer coated with a resin mold or the like may be used. The protective layers and so forth on both surface sides of the magnetic layer are not an essential structure, and a magnetic marker only having a magnetic layer may be used. In this case, at the time of installation, installation is preferably made so that the outer periphery of the magnetic marker is covered with a protective material.

(2) Regarding the Magnetic Marker Fabricating Method

In the present example, the layer serving as the magnetic layer 11, the layer serving as the protective layer 12, and so forth are punched out from the intermediated sheet 104B stacked in advance to efficiently fabricate the magnetic markers 1. If the large-format intermediate sheet 104B is prepared and the plurality of magnetic marker 1 is punched out, fabrication efficiency can be improved, and product cost can be reduced. For example, to achieve lane departure warning, automatic driving, or the like, the magnetic markers 1 are required to be continuously laid along the lane at relatively short spacings, and an enormous number of magnetic markers 1 are required. Therefore, reduction in product cost of the magnetic markers 1 is directly linked to reduction in installation cost of the magnetic markers 1.

Here, the magnetic layer 11 of the magnetic marker 1 is a layer with an iron oxide as the magnetic powder 111 dispersed therein. The magnetic powder 111 of the iron oxide is suitable for the method of fabricating the magnetic marker 1 by punching process. This is because, in the magnetic marker 1 in which the iron oxide is adopted as a magnetic material, degradation in performance due to oxidation is less prone to occur and thus the need for coating process on a punched cross section and so forth is small, allowing reduction in time and effort.

Furthermore, in the present example, the punching die 3 capable of stacking the punched magnetic markers 1 in the die is used to form the stack 100 of the magnetic markers 1. And, the holder 34 capable of accommodating this stack 100 and discharging one by one is used to transfer the magnetic markers 1 one by one as stamping to the carrier sheet 400. When the thin magnetic marker 1 having a large diameter is singly handled, the outer periphery may be chipped or cracked. On the other hand, in the fabricating method of the present example, the magnetic markers 1 are not handled individually. The magnetic marker 1 in the fabricating process in the fabricating method of the present example is in any of a state of forming a part of the intermediate sheet 104B, a state of configuring the stack 100, and a state of being retained on the carrier sheet 400. Since the magnetic markers 1 are less handled individually, troubles such as chipping and cracking of the outer periphery as described above can be prevented in advance.

Note that the above-described punching die 3 can be utilized as the holder 34. If the height of the bottom dead center of the Thomson holder 32 is adjusted so that the carrier sheet 400 is not punched and the suction unit 33 is operated so as to push out the stack 100 every time the magnetic marker 1 is transferred, the function of the holder 34 can be achieved by using the structure of the punching die 3. When the punching die 3 is utilized as the holder 34, it is preferable to punch the intermediate sheet 104B turned upside down so that the layer serving as the joint layer 16 is oriented to an upper surface. Punching in this manner allows the nonskid layer 15 to be positioned on a carrier sheet 400 side when the magnetic marker 1 is transferred to the carrier sheet 400.

(3) Regarding the Roll Body Retaining the Magnetic Markers

If the roll body 10 with the carrier sheet 400 retaining the magnetic markers 1 wound therearound is used, transportation to an installation site and so forth is quite easy. Furthermore, the magnetic markers 1 can be laid one by one while the carrier sheet 400 is rolled out. In the roll body 10, since the magnetic markers 1 are protected in a state of being rolled in the carrier sheet 400, troubles such as chipping and cracking during storage and transportation can be prevented in advance.

While polyethylene is exemplarily described as a material of the carrier sheet 400, a resin material such as polypropylene may be adopted in place of this, and paper, cloth, or the like may be used.

While the roll body 10 having the magnetic markers 1 placed one by one in a longitudinal direction of the carrier sheet 400 is exemplarily described, for example, when a plurality of, such as two or three, magnetic markers 1 are placed in parallel along the lane, the broad carrier sheet 400 which retains the plurality of them in parallel can be adopted. Here, the parallel width of the magnetic markers 1 on the carrier sheet 400 may match the parallel width at the time of laying on the lane. In this case, the plurality of magnetic markers 1 retained in parallel on the carrier sheet 400 can be transferred to the road surface 53 as being directly reprinted thereto.

(4) Installation of the Magnetic Markers (Laying on the Road Surface)

In the installation of the present example, the road surface 53 corresponding to the position where the magnetic marker 1 is to be laid is heated in advance, and the magnetic marker 1 with the joint layer 16 made of asphalt formed on an installation surface is pressed. For example, if the magnetic marker 1 is placed on the road surface 53 heated in advance, asphalt forming the joint layer 16 can be made by heat of the road surface 53 close to a molten state and be integrated with asphalt on the road surface 53 side, thereby allowing the magnetic marker 1 to be strongly bonded.

On the surface side of the magnetic marker 1 in an installation state, the nonskid layer 15 also mainly made of asphalt is formed. In the present example, after the magnetic marker 1 is placed on the road surface 53 as described above, the range including the surface of the magnetic marker 1 is again heated and pressurized. If the surface side of the magnetic marker 1 is heated with the surrounding road surface 53, the nonskid layer 15 and the surrounding asphalt can be made close to a molten state. With pressurization in this state, the surface can be leveled off while asphalt of the nonskid layer 15 and the surrounding asphalt are made close to be completely integrated. If a boundary or step between the magnetic marker 1 and its surroundings can be solved, external forces which may act on the magnetic marker 1 when the tires of the vehicle passes therethrough can be reduced, and the possibility of occurrence of trouble to the magnetic marker 1 can be reduced.

Furthermore, in the installation of the present example, after the laid magnetic marker 1 is heated and pressurized, the magnetic marker 1 is magnetized by acting with the magnetic field from the work vehicle 4 side, thereby achieving a desired magnetic characteristic. In this manner, if magnetization is performed after the heating process, there is no worry of troubles due to demagnetization or degaussing that can happen because the temperature of the magnetic powder 111 heated in the heating process reaches the Curie temperature.

The structure is exemplarily described in which the carrier sheet 400 is pressurized by the pressure roller 431 from the back side for press-fit of the magnetic marker 1 onto the road surface 53. In place of this, a pick and place mechanism can also be used in which the magnetic marker 1 is suctioned and taken out from the rolled-out carrier sheet 400 to be transferred to the road surface 53. The pick and place mechanism can advance and recede, for example, in a left-and-right direction and a vertical direction, and can be configured of a placing apparatus including a suction head which can suction the magnetic marker 1 by negative pressure.

In the present example, the sheet-shaped magnetic marker 1 is exemplarily described as a magnetic marker. The shape of the magnetic marker may be a columnar shape having a circular cross section, a polygonal cross section, or the like. As a combination of a height and an outer diameter of the columnar-shaped magnetic marker, the shape may be a long and narrow columnar shape having a height dimension larger than its outer diameter, or may be a short columnar shape having an outer diameter dimension larger than its height. For example, the shape may be a columnar shape having a height of 10 mm and a diameter of 30 mm.

As a method of fabricating columnar-shaped magnetic markers, there are a fabricating method in which the pellets 101 are molded or so, as depicted in FIG. 6(*b*), and a fabricating method in which a predetermined shape is molded and is then processed to have a predetermined length, and so forth.

For example, in the case of a columnar-shaped magnetic marker having a height of 10 mm and a diameter of 30 mm, as with the case of the present example, a carrier sheet retaining these magnetic markers may be rolled to a roll body, and stored and transported as the roll body. Furthermore, these magnetic markers may be placed in a plurality of rows on a broad carrier sheet and the sheet may be rolled into a roll shape.

Furthermore, a retaining member such as a tray or plate where the plurality of magnetic markers are two-dimensionally placed may be adopted, and the magnetic markers are stored or transported in a state of being retained on the retaining member. As for handling of the magnetic markers retained on the retaining member, a pick and place mechanism is effective which can advance and recede, for example, in a left-and-right direction and a vertical direction, and includes a suction head which can suction the magnetic marker by negative pressure. The structure is preferably adopted in which the suction head suctions and receives the magnetic markers one by one from the retaining member and sequentially places them on the road. Note that application of the pick and place mechanism is effective also for a carrier sheet having the magnetic markers placed in a plurality of rows.

To lay columnar-shaped magnetic markers, accommodation spaces, such as indentations or holes, for accommodating the magnetic markers are preferably formed in advance in the road. For example, as for the work vehicle 4 exemplarily depicted in FIG. 10, an apparatus for forming the above-described accommodation spaces is preferably provided in place of the heating apparatus 411 on the front side or at an intermediate position between this heating apparatus 411 and the cleaning apparatus 410. For example, in the case of a short columnar-shaped magnetic marker having a height of 10 mm and a diameter of 30 mm, a tool such as a punch may be pressed to make a dent in the road surface to form the above-described accommodation space. Alternatively, a hole process may be performed with a tool such as a drill to form the above-described accommodation space on the road surface.

As for the above-described accommodation space, a large dimension in a depth direction is preferably ensured with respect to the height of the magnetic marker. In this case, while an upper end face of the magnetic marker placed in the accommodation space is lower than the road surface, it is preferably sealed by being filled with, for example, a methacrylic-resin-based filler, to enhance uniformity with the surrounding road surface. Note that asphalt may be adopted as a filler. As for the work vehicle, an apparatus which supplies the filler to the road surface side is preferably provided.

Furthermore, in filling with the filler, a woven fabric or nonwoven fabric of glass fiber, carbon fiber, cellulose nanofiber, or the like may also be placed on the upper end face side of the magnetic marker. In this case, the woven fabric or nonwoven fabric is impregnated with the filler, thereby allowing the characteristics of the filler to be enhanced. As for the size of the woven fabric or nonwoven fabric, the size may be smaller than the shape of the cross section of the accommodation space, but may be next larger than the shape of the cross section of the accommodation space. If the woven fabric or the like is larger than the shape of the cross section of the accommodation space, the magnetic marker together with the road surface surrounding the accommodation space can be integrally covered. In this case, an opening portion of the accommodation space can be protected integrally with the surrounding road surface. For example, a depression or the like of the opening portion of the accommodation space can be reduced, and a favorable laid state of the magnetic markers in road operation over a long period of time can be maintained for a long time.

Note that while installation in which the magnetic markers 1 are continuously placed along the lane is exemplarily described in the present example, for example, in order to make a notification about information indicating the approach of a branch, intersection, or the like, the magnetic marker 1 may be placed before the branch or the like.

In the present example, the example is such that the nonskid layer 15 including asphalt is provided in advance on the surface side of the magnetic marker 1. In place of or in addition to this, after the process of placing the magnetic marker 1 and before the above-described second heating process (post-heating process), a process of forming an asphalt layer on the surface side of the magnetic marker 1 can be performed.

The work vehicle 4 including the magnetizing apparatus 45 can also be applied to works such as re-magnetization for changing magnetic polarity of the magnetized magnetic marker and re-magnetization on the magnetic marker where demagnetization has occurred with years of use. If the detecting apparatus 47 is provided, a check of magnetic polarity of the re-magnetized magnetic marker, a check of magnetic characteristics, and so forth can be made in conjunction.

In the present example, the work vehicle 4 is exemplarily described as one example of a work apparatus which rolls out the carrier sheet 400 from the roll body 10. The work apparatus may be an apparatus that can be mounted on a vehicle, or may be an apparatus that can move by being pulled by a vehicle or the like.

In the present example, the MI sensor is exemplarily described as the magnetic sensor 2 which detects the magnetic marker 1. In place of this, a high-sensitivity sensor adopting another principle may be combined, for example, a fluxgate sensor or TMR sensor.

The fluxgate sensor is a highly-sensitive magnetic sensor which measures magnetic intensity from a saturation timing by using the fact that the saturation timing of a core flux changes in accordance with the external magnetic field when a periodic current flows through a soft magnetic core. Note that as for the fluxgate sensor, many applications have been filed and detailed descriptions are in, for example, International Publication WO2011/155527 and Japanese Unexamined Patent Application Publication No. 2012-154786.

The TMR (Tunneling Magneto Resistive) sensor is a highly-sensitive sensor with a structure in which an insulator layer having a film thickness on the order of 1 nm is interposed between ferromagnetic layers. The TMR sensor achieves high sensitivity by using the tunneling magneto resistive (TMR) effect, in which the electric resistance of the insulator layer significantly changes in accordance with the external magnetic field when a voltage applied vertically with respect to the film surface produces a tunnel effect that permits a current flow through the insulator layer. Note that as for the TMR sensor, many applications have been filed and detailed descriptions are in, for example, International Publication WO2009/078296 and Japanese Unexamined Patent Application Publication No. 2013-242299.

While the specific examples of the present invention have been described above in detail as in the above embodiments, these specific examples merely describe examples of technologies included in the claims. Needless to say, the claims should not be restrictively construed by the structures, numerical values, and so forth of the specific examples. The claims include technologies obtained by variously modifying, changing, and combining the specific examples as appropriate by using known technologies, knowledge by people skilled in the art, and so forth.

REFERENCE SIGNS LIST

1 magnetic marker
10 roll body
100 stack
104A magnetic sheet
104B intermediate sheet
11 magnetic layer
12 protective layer
15 nonskid layer
16 joint layer
2 magnetic sensor
3 punching die
34 holder
4 work vehicle (work apparatus, work vehicle system)
40 sheet roll
400 carrier sheet
411, 412 heating apparatuses
42 supply apparatus
43 placing apparatus
45 magnetizing apparatus
47 detecting apparatus
5 vehicle
53 road surface

The invention claimed is:
1. A work apparatus, comprising:
a roll-out shaft configured to
retain a roll body formed of rolling up, in a roll shape, a band-shaped carrier sheet having a plurality of sheet-shaped magnetic markers, the plurality of sheet-shaped magnetic markers being spaced in a longitudinal direction of the band-shaped carrier sheet, the band-shaped carrier sheet being rolled up such that each surface of the plurality of sheet-shaped magnetic markers directly contacts the other side of the surface of the band-shaped carrier sheet, on which the plurality of sheet-shaped magnetic markers are placed, and roll out the band-shaped carrier sheet;

a pressure roller configured to press the band-shaped carrier sheet on the road with the surface facing the road such that the plurality of sheet-shaped magnetic markers are placed on the road;

a roll-up shaft configured to roll up the band-shaped carrier sheet after the plurality of sheet-shaped magnetic markers are placed on the road by the pressure roller and taken out from the band-shaped carrier sheet; and a first heating apparatus configured to heat the road, the first heating apparatus being located relative to the pressure roller such that the road is heated before the band-shaped carrier sheet is pressed on the road.

2. The work apparatus according to claim 1, wherein
the work apparatus is a vehicle including driving wheels, and
the roll-out shaft is configured to roll out the band-shaped carrier sheet by following rotation of the driving wheels so that the magnetic markers are supplied for each arrival of a position where the magnetic marker is to be laid.

3. The work apparatus for magnetic markers according to claim 1, wherein the plurality of sheet-shaped magnetic markers are to be detected by a magnetic sensor attached to a vehicle.

4. The work apparatus for magnetic markers according to claim 1, wherein
the work apparatus is a vehicle, and
the first heating apparatus is located closer to a front of the vehicle than the pressure roller.

5. The work apparatus for magnetic markers according to claim 1, further comprising a second heating apparatus configured to heat the road, the second heating apparatus being located relative to the pressure roller such that the road is heated by the second heating apparatus after the band-shaped carrier sheet is pressed on the road.

* * * * *